(12) United States Patent
Taylor et al.

(10) Patent No.: US 6,328,938 B1
(45) Date of Patent: Dec. 11, 2001

(54) MANUFACTURE OF TITANIUM DIOXIDE WITH RECYCLE OF WASTE METAL CHLORIDE STREAM

(76) Inventors: Timothy L. Taylor, 853 Taft Pl., New Orleans, LA (US) 70119; Tommy G. Taylor, 4011 Creole St., Lake Charles, LA (US) 70605

( * ) Notice: Subject to any disclaimer, the term of this patent is extended or adjusted under 35 U.S.C. 154(b) by 0 days.

(21) Appl. No.: 09/576,846

(22) Filed: May 23, 2000

Related U.S. Application Data

(63) Continuation-in-part of application No. 08/864,194, filed on May 28, 1997, now abandoned.
(60) Provisional application No. 60/019,000, filed on Jun. 3, 1996.

(51) Int. Cl.[7] .................... C22B 34/00; C22B 21/00; C22B 26/00; C22B 7/00
(52) U.S. Cl. ................ 423/79; 423/50; 423/55; 423/127; 423/140; 423/164; 423/610
(58) Field of Search ............... 423/610, 82, 79, 423/74, 140, 50, 127, 66, 85, 55, 164; 405/53; 205/536

(56) References Cited

U.S. PATENT DOCUMENTS

| | | | |
|---|---|---|---|
| 4,073,706 | * 2/1978 | Nagy | 423/198 |
| 4,100,252 | * 7/1978 | Pitts | 423/62 |
| 4,489,045 | * 12/1984 | Rado | 423/79 |
| 4,906,135 | * 3/1990 | Brassow et al. | 405/128 |
| 5,004,298 | * 4/1991 | Boulanger | 299/5 |
| 5,135,734 | * 8/1992 | Ninane | 423/659 |
| 5,271,910 | * 12/1993 | van der Meer et al. | 423/63 |
| 5,334,362 | * 8/1994 | Schinkitz et al. | 423/74 |
| 5,518,633 | * 5/1996 | Brown et al. | 423/DIG. 1 |

FOREIGN PATENT DOCUMENTS

390293 * 10/1990 (EP) .

* cited by examiner

Primary Examiner—Steven Bos
(74) Attorney, Agent, or Firm—Domingue & Waddell; Henry E. Naylor

(57) ABSTRACT

A method for the integration of a manufacturing facility with a salt dome, which manufacturing facility is one for the production of high purity titanium dioxide using chlorine as a reactant. The metal chlorides produced as a by-product of titanium dioxide production are reacted with sodium hydroxide to produce metal hydroxide precipitates in an aqueous sodium chloride solution, which is then conducted into a reservoir of brine in a salt dome. The metal hydroxide precipitates are allowed to settle and the sodium chloride solution mixes with the brine. A portion of the brine is conducted to the surface where it is decomposed to produce chlorine, hydrogen, and sodium hydroxide. The chlorine and sodium hydroxide are recycled for use in the overall integrated process.

10 Claims, 1 Drawing Sheet

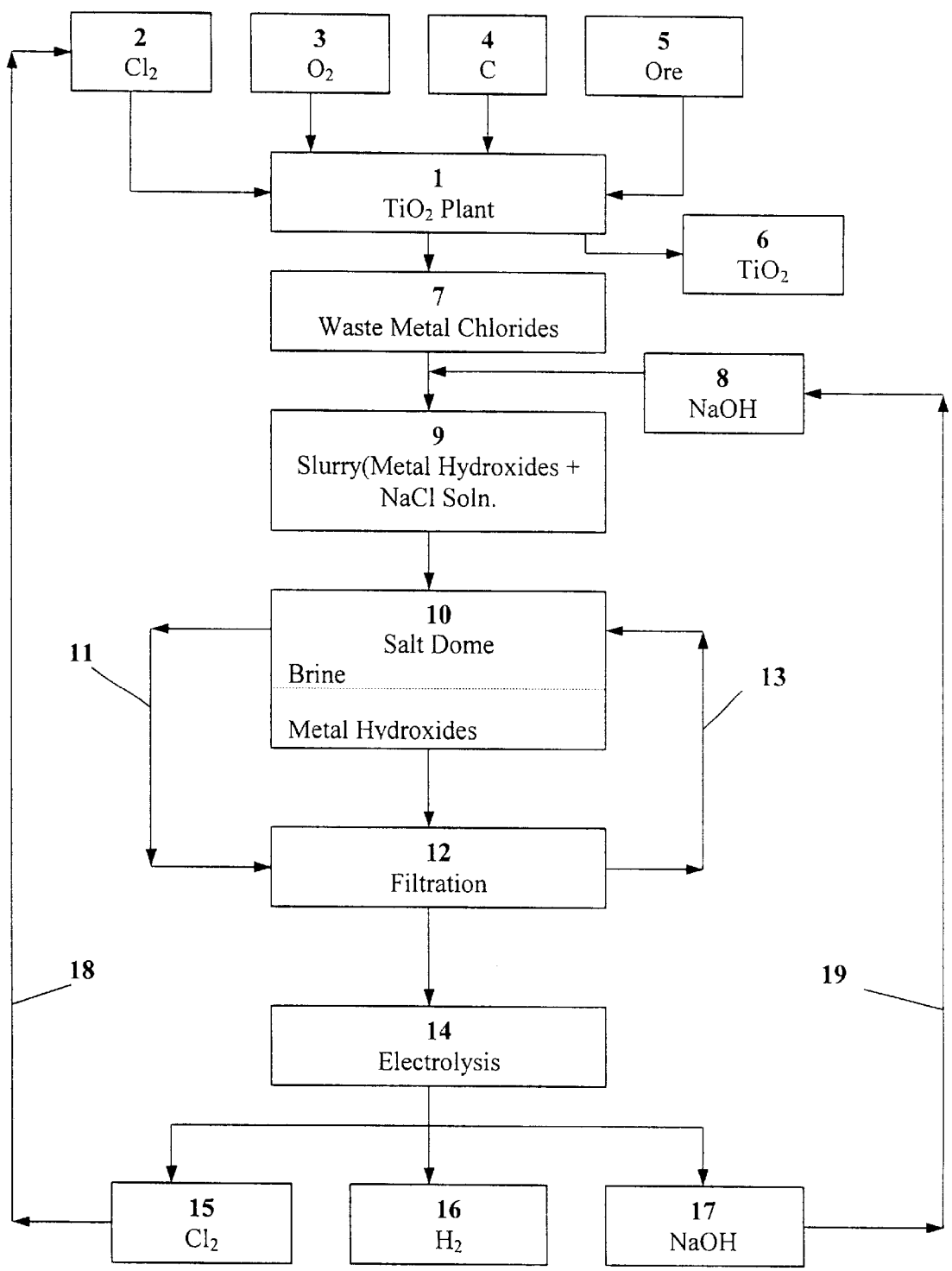

MANUFACTURE OF TITANIUM DIOXIDE WITH RECYCLE OF WASTE METAL CHLORIDE STREAM

CROSS REFERENCE TO RELATED APPLICATIONS

This is a continuation-in-part of U.S. Ser. No. 08/864,194 filed May 28, 1997, now abandoned which is based in part on Provisional Patent Application Ser. No. 60/019,000, filed Jun. 3, 1996.

FIELD

The present invention relates to the integration of a manufacturing facility for the production of high purity titanium dioxide using chlorine as a reactant and a brine-containing salt dome.

BACKGROUND

High purity titanium dioxide is an important commercial product, primarily because it is the predominant white pigment used for a wide range of products, including paints, white rubbers and plastics, paper, inks, etc. Titanium dioxide is obtained from various titanium-bearing ores, such as ilmenite, natural rutile, and leucoxene that occur as mineral sands and massive hard rock formations in many parts of the world. Rutile is the ore of choice for the production of high purity pigmentary grade titanium dioxide. The ores must be processed to remove impurities that darken the titanium dioxide crystals. These impurities include, inter alia, iron, chromium, vanadium, aluminum, and manganese and they must be removed in order for the titanium dioxide to be suitable for use as a high quality white pigment. One of the main commercial routes for the manufacture of high purity titanium dioxide is the so-called "chloride process". One of the first stages of the chloride process is carbothermal chlorination wherein the titanium-bearing ore is treated with carbon and chlorine at suitable process conditions to produce titanium tetrachloride and waste by-products comprised of metal chlorides. The titanium tetrachloride is purified and oxidized to produce high purity titanium dioxide.

The waste metal chlorides, which are acidic, must be disposed of in an environmentally friendly manner. It is well known that acidic waste metal chlorides may be dissolved in water and then treated, or rendered non-acidic, by reacting them with basic solutions, such as, for example, calcium hydroxide (milk of lime) or sodium hydroxide (caustic soda). The end products of treatment with such basic solutions are solid hydroxide precipitates of the metals of the metal chlorides and an aqueous solution of the salts of sodium chloride or calcium chloride. Non-limiting examples of metal hydroxide precipitates from such a process include ferrous hydroxide, aluminum hydroxide, magnesium hydroxide, chromium hydroxide, and manganese hydroxide. Few methods exist for acceptably disposing of the resulting metal hydroxide precipitates as well as the salt solutions. The most common method for disposing of metal hydroxides is to deposit them into landfills. Such deposits are typically not environmentally safe indefinitely. Long-term contact with naturally acidic rainfall could leach the metals from such deposits and thus have an adverse environmental impact on surrounding water and soil.

Another suggested method of disposing of metal hydroxide precipitates is to inject them as a water-borne slurry into deep porous underground strata. This method has not met with environmental approval because of concern that the slurry might contaminate subterraneous fresh-water aquifers.

Also, few methods have been devised for adequately disposing of the aqueous salt solution end products. If the metal chlorides have been neutralized with calcium hydroxide, the resulting salt in solution will be calcium chloride. Calcium chloride solution is sometimes dumped into brackish estuaries, or other marine bodies, where it is generally rendered harmless by dilution effects. However, in some instances salt concentrations could become excessively high, thereby creating environmental hazards. Furthermore, traditional desalination techniques that remove salts from water are costly and are extremely energy intensive.

If the metal chlorides have been neutralized with sodium hydroxide, the resulting salt in solution will be sodium chloride. There are currently operations in the United States that produce sodium chloride solutions, also referred to herein as "brine", as a result of the aforementioned treatment process. Some of these operations are inland where the brine cannot be dumped because it will harm freshwater environments. Consequently, the sodium chloride must be taken out of solution by boiling away the water and leaving behind the solid salt that may then be reused in any number of applications. There are clear disadvantages to such a salt disposal method. Desalination techniques, resulting in solid salts that are more easily disposable, are, as noted, extremely energy intensive and are not cost-effective.

Thus, a long-standing need has existed for a practical and environmentally acceptable method for disposing of both the metal hydroxide precipitates and the salt solution end products of the waste chloride treatment process.

SUMMARY OF THE INVENTION

In accordance with the present invention there is provided a process for producing titanium dioxide, in an above ground processing plant, from an ore containing titanium dioxide and recycling a resulting waste metal chloride by-product stream. The process comprises treating said ore with one or more reagents, one of which is chlorine, thereby resulting in titanium dioxide and a by-product stream comprised of metal chlorides. The metal chlorides are treated with an aqueous sodium hydroxide solution, thereby resulting in a slurry comprised of metal hydroxide precipitates of the metal of said metal chloride by-product stream, and an aqueous sodium chloride solution. The slurry is conducting into a cavity of an underground sodium chloride salt formation which cavity contains a reservoir of brine and the metal hydroxide precipitates are allowed to settle within said reservoir of brine. At least a portion of brine is conducted from the salt formation and decomposed to produce chlorine, hydrogen, and sodium hydroxide. The chlorine is recycled to the titanium dioxide production plant and the sodium hydroxide can be recycled for treating additional metal chlorides. The process is a continuous process and all steps are preferably in direct fluid communication with the next downstream step.

In a preferred embodiment of the present invention the cavity of the salt dome is substantially filled with brine.

In another preferred embodiment of the present invention the brine after being conducted from the salt dome is subjected to filtration to remove particulates.

In yet another preferred embodiment of the present invention brine, which is conducted from the salt dome, is decomposed by a convention electrolysis technique.

In still another preferred embodiment of the present invention the titanium dioxide manufacturing facility is in direct fluid communication with the salt dome.

BRIEF DESCRIPTION OF THE FIGURES

The sole FIGURE hereof is flow chart illustrating one preferred embodiment of the present invention, reference should be made to the following detailed description.

DETAILED DESCRIPTION

A chloride process, which utilizes chlorine as a reagent, is used in the present invention to produce titanium dioxide from a titanium dioxide containing ore with recycle to extinction at least a portion of the resulting metal chloride waste stream. It involves the use of one or more sodium chloride salt domes as an integral part of the overall process, preferably in direct fluid communication with the above ground titanium dioxide plant. The use of a sodium chloride salt dome represents an environmentally acceptable, cost-effective manner for disposing of and recycling to extinction, various by-product streams produced during the production of titanium dioxide and the treatment of the resulting metal chloride waste stream.

Salt domes are massive, geologically stable, naturally occurring deposits of sodium chloride that rise from deeply buried beds. They often are a mile or more in diameter and several miles deep. Salt has been mined from these domes for many years, usually through the solution mining technique, where fresh water is pumped into the solid core, thus dissolving the salt until the solution becomes saturated at about three hundred (300 g.) grams of sodium chloride per liter of water. This saturated salt solution is typically referred to as "brine". Sometimes ordinary non-solution mining techniques are used.

In solution mining, the resulting brine is pumped out and used for the production of chlorine, sodium carbonate, sodium hydroxide, hydrogen gas and other chemicals. There are many uses for such chemicals, such as in cooking, food preservation, and snow-melting applications.

Cavities created in the salt dome by solution mining techniques are typically filled with brine, although there has been some limited use of brine-free salt dome cavities as containers for the storage of commodity materials. Since these cavities may be millions of barrels in volume, the US government has been using some salt dome cavities to store crude oil as part of the United States Strategic Oil Reserves. The oil and gas industry is using such cavities to store hydrocarbons, such as methane, ethane, ethylene, propylene, etc. Brine replaced from the cavities may be pumped out to sea, or it may be used in the electrolytic techniques of producing other chemicals as mentioned above.

Another use of salt domes is disclosed in U.S. Pat. No. 4,906,135 to Brassow et al, which is incorporated herein by reference and which discloses a method and apparatus for the storage of hazardous waste within a salt dome. The method of the Brassow et al patent requires cement casings leading into the salt dome for the safe transfer of the hazardous waste. A cavity is leached out of the salt dome through traditional solution mining techniques. Solidified waste material is deposited into the cavity that has been lined with cement casing. The waste material is first received in a variety of forms—solids, semi-solids, and liquids. The material is then chemically treated and solidified for deposit into the salt dome cavity. Nothing other than a solid is deposited into the salt dome, and nothing is removed or recycled from the salt dome, unlike the present invention.

Therefore, while salt domes have been utilized for hydrocarbon storage and for storing solid hazardous waste, sometimes within a cement casing, they have never been used as an integral stage of an above ground chemical plant wherein waste products produced in the above ground plant are recycled underground where some components are permanently stored an others are recycled to extinction.

In the preferred embodiment of the present invention, waste metal chlorides produced in the manufacture of titanium dioxide are treated with sodium hydroxide, thereby forming a slurry of metal hydroxide precipitates in an aqueous sodium chloride solution. The metals of the metal hydroxide precipitates are those of the metal chloride waste by-product stream. This slurry is pumped into the cavity of a salt dome that preferably contains brine, more preferably the cavity is substantially filled with brine. The metal hydroxide precipitates are allowed to settle and remain undisturbed at the bottom of the cavity of the salt dome. The sodium chloride solution is withdrawn from the cavity for recycling. The sodium chloride is recycled by subjecting it to conventional electrolysis techniques to produce hydrogen, sodium hydroxide, and chlorine. The chlorine is recycled to the above ground chemical plant for producing titanium dioxide. The sodium hydroxide is recycled to a facility for treating the newly generated waste metal chloride streams to again produce metal hydroxide precipitates in sodium chloride solution.

It is thus an object of the present invention to provide a method for disposing of waste metal chlorides that is environmentally acceptable as well as cost effective.

It is a further object of the invention to provide a method for disposing of waste chlorides that takes advantage of naturally occurring salt domes by utilizing the brine within them.

As previously stated, the present invention represents a unique method for recycling the aqueous sodium chloride solution produced as a result of the treatment of metal chlorides with sodium hydroxide, since the brine displaced in the cavern may be drawn out and piped to facilities that will then, through electrolysis, separate the sodium chloride salt into chlorine, hydrogen gas, and sodium hydroxide. The chlorine may then be used, if so desired, in the manufacturing process that generated the waste chlorides. The sodium hydroxide may be used to treat the newly generated waste chlorides, thereby creating a balanced manufacturing/recycling process.

It is also anticipated that the process of the present invention can be accommodated for treating a variety of waste metal chlorides left over from various metal extraction techniques, such as, for example, the chloride process for producing titanium dioxide and the Toth Process for producing aluminum.

FIG. 1 shows a preferred embodiment for practicing the present invention. It shows a chloride process for manufacturing titanium dioxide 1 using chlorine 2, oxygen 3, carbon 4, and a titanium dioxide containing ore 5, yielding titanium dioxide product 6, and waste metal chlorides 7. Non-limiting examples of metal chlorides produced during titanium dioxide production include ferrous chloride, aluminum chloride, chromium chloride, magnesium chloride, and manganese chloride. Any source of carbon can be used that is suitable in the manufacture of titanium dioxide. Petroleum cokes are preferred. These waste metal chlorides are treated with sodium hydroxide 8 to yield a slurry of metal hydroxides in an aqueous sodium chloride solution 9. This slurry is pumped into a cavity of a salt dome 10, preferably already containing brine. Within an effective amount of time, typically in a matter of a few hours, the metal hydroxides will precipitate out of solution and start settling to the bottom of the salt dome. The sodium chloride solution mixes with the brine and moves upward in the cavity.

A portion of the brine is then withdrawn via line 11 from the salt dome for recycling, or left within the cavity, space permitting. It is to be understood that the brine may or may not be a saturated sodium chloride aqueous solution. Once withdrawn, the brine is passed to filtration 12 to remove particulates. Any particulates, which will typically be comprised of the solid metal hydroxide precipitate, are recycled via line 13 to salt dome 10. After filtration, the filtered brine is subjected to conventional electrolysis 14 that yields a variety of chemicals including chlorine 15, hydrogen 16, and a solution of sodium hydroxide 17. The chlorine can be recycled via line 18 to the manufacturing process at 1 where it is used for the production of titanium dioxide from a titanium dioxide containing ore. The sodium hydroxide solution 17 is recycled via line 19 for treating waste metal chlorides.

It is preferred that the titanium dioxide manufacturing facility be located as close to the salt dome as practical so that the entire process can be in direct fluid communication via conventional pipelines and ancillary equipment of suitable size. It is also within the scope of this invention that the other means can be used for transporting the various product, reagent, and recycle streams other than direct pipeline. For example, one or more of such streams can be transported by barge to the next processing step, although this is not particularly desirable since each such transportation step would add to cost of producing the titanium dioxide or disposing of the waste metal chlorides.

Access to the salt dome, which will typically be under multiple layers of overlying formations, such as layers of sand, clay, and rock is had through conventional means of entry, such as those used in the solution mining techniques. Generally a cement surface casing will be formed on an outer casing accessing the salt dome. A second or final casing then provides direct access through the annulus of a tubing string and for extraction of materials through the annulus. The waste slurry is conducted to the cavity through a tubing string extending a predetermined and effective distance into the cavity. The heavier metal hydroxide precipitates settle to the bottom of the cavity, while the incoming sodium chloride solution mixes with the brine already in the cavity. Since the cavity is normally filled with settled solids and liquid brine, the incoming slurry displaces clean saturated brine (about 300 g. of sodium chloride per liter of solution) out the top of the cavity through the annulus surrounding the entrance of a tubing string.

In the event that the cavity is oblong in shape, which sometimes occurs when two cavities being mined close to each other wash together to form one big cavity, the entrance tubing can be located in one section of the cavity and the exit tubing in another. As the cavity fills with solids, the entrance tubing can be withdrawn and shortened to provide more space for solids settling. Some salt dome cavities located near certain generators of waste metal hydroxides are large enough to provide upwards of fifty years, or more, of storage space for those waste metal hydroxides.

There is no danger that these metal hydroxides will escape into freshwater systems, since the salt domes, by nature, exist only in the absence of underground freshwater sources. The solid wall of the salt cavities are still vast and remarkably stable, as their suitability for storing crude oil and other hydrocarbons would indicate. Eventually, in a matter of several hours or a few days, it is predicted that the metal hydroxide precipitates will compress into a solids layer at the bottom of the cavity.

In manufacturing processes, where calcium hydroxide is used to treat waste metal chlorides, the resulting salt in calcium chloride. Slurry streams containing calcium chloride salts cannot be fed into sodium chloride salt domes without rendering the sodium chloride brine non-recyclable. Salt solutions displaced from brine cavities by slurries containing calcium chloride most likely would have to be discharged into the Gulf of Mexico or into some other great body of water. Because of this, weak sodium hydroxide liquor, as it exits the electrolysis cells in typical chlorine-alkali operations, is thought to be the best source of alkali for treating waste chlorides, when the resulting metal hydroxides are to be disposed of in salt dome cavities.

What is claimed is:

1. A process for producing titanium dioxide, in an above ground processing plant, from an ore containing titanium dioxide and recycling a resulting waste metal chloride by-product stream, which process comprises:
   a) treating said ore with one or more reagents, one of which is chlorine, thereby resulting in titanium dioxide and a by-product stream comprised of metal chlorides;
   b) treating said metal chloride by-product stream with an aqueous sodium hydroxide solution, thereby resulting in a slurry comprised of metal hydroxide precipitates of the metal of said metal chloride by-product stream, and an aqueous sodium chloride solution;
   c) conducting said slurry into a cavity of an underground sodium chloride salt formation which cavity contains a reservoir of brine;
   d) allowing said metal hydroxide precipitates to settle within said reservoir of brine;
   e) conducting a portion of said brine away from said cavity:
   f) decomposing said portion of brine to produce chlorine, hydrogen, and sodium hydroxide;
   g) recycling said chlorine of step f) to step a) above, thereby resulting in additional metal chloride by-products;
   h) repeating steps b) through g).

2. The process of claim 1 wherein each step in said process is in direct fluid communication with the next subsequent step.

3. The process of claim 1 wherein said brine, once conducted from said cavity undergoes filtration to remove particulates.

4. The process of claim 1 wherein at least a portion of the sodium hydroxide solution used for treating said metal chlorides is obtained from decomposing of said brine solution in step f).

5. The process of claim 1 wherein said brine is decomposed by electrolysis.

6. The process of claim 1 wherein said brine is a substantially saturated sodium chloride aqueous solution.

7. The process of claim 1 wherein said brine substantially fills said cavity of said salt formation.

8. A process for producing titanium dioxide in an above ground processing plant from an ore containing titanium dioxide and recycling a waste metal chloride by-product stream, which process comprises:
   a) treating said ore with one or more reagents, one of which is chlorine, thereby resulting in titanium dioxide and a by-product stream comprised of metal chlorides;

b) treating said metal chloride by-product stream with an aqueous sodium hydroxide solution, thereby resulting in a slurry comprised of metal hydroxide precipitates of the metal of said metal chloride by-product stream, and an aqueous sodium chloride solution;

c) conducting said slurry into a cavity of an underground sodium chloride salt formation which cavity contains a reservoir of brine, said salt formation being in fluid communication with said processing plant;

d) allowing said metal hydroxide precipitates to settle within said reservoir of brine;

e) conducting a portion of said brine away from said cavity;

f) filtering said brine conducted away from said cavity to remove particulates;

g) electrolyzing said filtered brine to produce chlorine, hydrogen, and sodium hydroxide;

h) recycling said chlorine of step g) to step a) above, thereby resulting in additional metal chloride by-products;

i) recycling at least a portion of said sodium hydroxide produced in step g) above to step b) above for treating said metal chlorides;

j) repeating steps b) through i).

9. The process of claim 8 wherein any filtrate resulting from said filtering step f) is recycled to said cavity.

10. The process of claim 8 wherein each step in said process is in direct fluid communication with the next subsequent step.

* * * * *